(12) United States Patent
Gisler

(10) Patent No.: US 7,657,226 B2
(45) Date of Patent: Feb. 2, 2010

(54) KEYFOB WITH DIGITAL FILE STORAGE AND VEHICULAR SYSTEM FOR THE USE THEREOF

(75) Inventor: Maurice J. Gisler, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 495 days.

(21) Appl. No.: 11/534,816

(22) Filed: Sep. 25, 2006

(65) Prior Publication Data

US 2008/0077292 A1 Mar. 27, 2008

(51) Int. Cl.
*G06F 7/00* (2006.01)
*H04B 1/00* (2006.01)
*H04H 40/00* (2008.01)
*H04B 7/00* (2006.01)
*H04B 1/18* (2006.01)
*H04M 1/00* (2006.01)

(52) U.S. Cl. .................. 455/41.2; 381/86; 455/3.06; 455/69; 455/186.1; 455/575.1; 701/36

(58) Field of Classification Search .............. 701/36; 381/86; 455/3.06, 41.2, 69, 186.1, 575.1
See application file for complete search history.

(56) References Cited

U.S. PATENT DOCUMENTS

| 5,337,588 | A | * | 8/1994 | Chhatwal | 70/278.3 |
| 6,775,603 | B2 | * | 8/2004 | Yester et al. | 701/36 |
| 2004/0092253 | A1 | * | 5/2004 | Simonds et al. | 455/414.2 |
| 2005/0100174 | A1 | * | 5/2005 | Howard et al. | 381/86 |
| 2005/0232438 | A1 | * | 10/2005 | Basir et al. | 381/86 |
| 2008/0150679 | A1 | * | 6/2008 | Bloomfield | 340/5.7 |

FOREIGN PATENT DOCUMENTS

| DE | 19919501 A1 | 6/2000 |
| DE | 102005030081 A1 | 1/2007 |
| DE | 102006000258 T5 | 12/2007 |

* cited by examiner

*Primary Examiner*—Nick Corsaro
*Assistant Examiner*—Larry Sternbane

(57) ABSTRACT

A keyfob is provided for use in a vehicle having a processor. The keyfob comprises a housing, a battery disposed within the housing, and control circuitry disposed within the housing and coupled to the battery. A memory coupled to the control circuitry is disposed within the housing and is configured to store data files therein accessible by the processor.

8 Claims, 3 Drawing Sheets

US 7,657,226 B2

KEYFOB WITH DIGITAL FILE STORAGE AND VEHICULAR SYSTEM FOR THE USE THEREOF

TECHNICAL FIELD

The present invention generally relates to keyfobs and, more particularly, to a keyfob capable of storing digital files (e.g., audio files) and to a vehicular system for accessing files stored on the keyfob.

BACKGROUND OF THE INVENTION

Portable devices that store and play digital audio files (e.g., MP3, WAV, ACC, and other such audio formats) have become increasingly popular in recent years. A digital audio device may comprise a relatively slim casing having a display and a control (e.g., a touch-scroll wheel and a group of buttons) disposed thereon. The casing contains a battery (e.g., a lithium ion cell), a circuit board, and a hard drive, which may be sheathed in a soft rubber to insulate the hard drive from the circuit board and to protect it from shock damage. The hard drive's capacity may range from, for example, 512 MB to 60 GB in size and store anywhere from 120 to 15,000 audio files, respectively.

To use a portable digital audio device, a user first builds a library of audio files on his or her home computer by downloading purchased songs from an internet site (e.g., the iTunes website) or by uploading converted songs from owned CDs or other media. A user may transfer selected audio files from his or her computer to the portable digital audio device via a docking station and associated software (e.g., iTunes media library software). The docking station may be coupled to the home computer via, for example, a universal serial bus or firewall port and to the digital audio device through a specialized connector port (e.g., a 30-pin connector port).

Consumers have shown a desire to utilize their portable digital audio devices in conjunction with their vehicular audio systems to, for example, play audio files with the vehicle's audio system. FM transmitters have been developed that connect to the digital audio device and broadcast music played thereby over an output frequency (e.g., 87.9 MHz) that may be received by the vehicle's FM radio. Certain audio systems provide auxiliary inputs that may be connected to the headphone output of a digital audio device via an audio interconnect cable. More recently, several automotive manufacturers have begun offering digital audio device interfaces permitting bi-directional communication between the vehicle's audio system and a digital audio device. After connecting a digital audio device to the interface (e.g., via a connector cable stowed in the vehicle's glove box), a driver may then control the device through the vehicle's audio system (e.g., through audio system controls mounted on the steering wheel) to select digital audio files to be played by the audio system system.

While providing users with the ability to play digital audio files with their vehicle's audio system, vehicular digital audio device integration systems of the type described above may be somewhat cumbersome to use. Systems utilizing FM modulators or audio interconnect cables require a user to utilize the controls provided on the digital audio device to select and play songs, which may be inconvenient. Furthermore, when using any of above-described integration systems, a user must repeatedly transport a digital audio device (and possibly other hardware) to and from his or her vehicle and perform the iterations necessary to properly connect the device to the integration system's interface.

In view of the above, it should be appreciated that it would be desirable to provide a system for playing digital audio files on a vehicle's audio system that utilizes a reduced number of required components. Furthermore, it should be appreciated that it would be advantageous if such a system facilitates access to the digital audio files. Other desirable features and characteristics of the present invention will become apparent from the subsequent detailed description and the appended claims, taken in conjunction with the accompanying drawings and the foregoing technical field and background.

SUMMARY OF THE INVENTION

A keyfob is provided for use in a vehicle having a processor. The keyfob comprises a housing, a battery disposed within the housing, and control circuitry disposed within the housing and coupled to the battery. A memory coupled to the control circuitry is disposed within the housing and is configured to store data files therein accessible by the processor.

Also provided is a keyfob system for use in conjunction with a vehicle. The system comprises a processor deployed on the vehicle, an audio system coupled to the processor, and a keyfob. The keyfob comprises a housing, a battery disposed within the housing, and a memory disposed within the housing and configured to store a plurality of digital audio files therein. Control circuitry is also disposed within the housing and coupled to the memory and to the battery. The control circuitry is configured to communicate with the processor to enable the audio system to play selected ones of the plurality of digital audio files.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
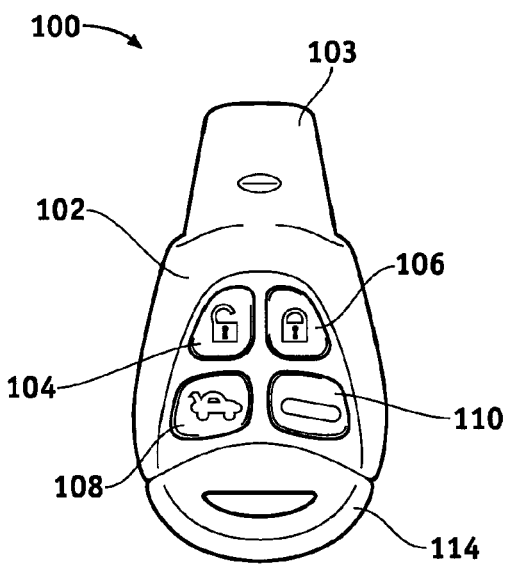
FIGS. 1 and 2 are front and rear isometric views, respectively, of a keyfob in accordance with a first embodiment of the present invention.
Figure 2:
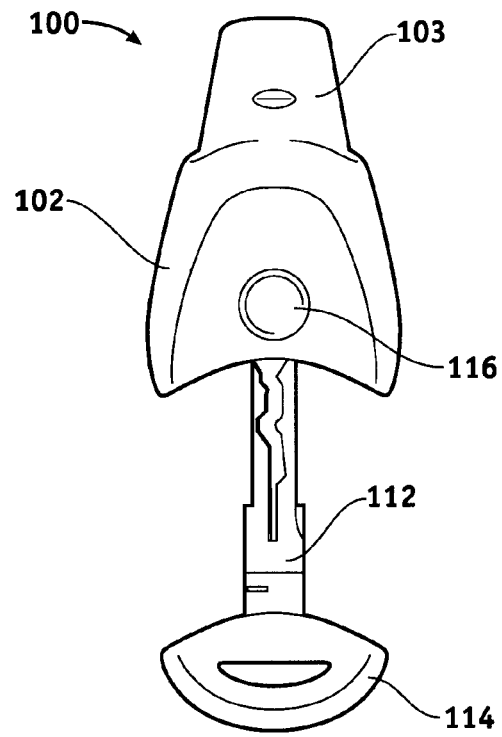

FIGS. 1 and 2 are front and rear isometric views, respectively, of a keyfob 100 in accordance with a first embodiment of the present invention. Keyfob 100 comprises a housing 102 including a protruding stem portion 103. A plurality of buttons is disposed on housing 102 and may include, for example, an UNLOCK button 104, a LOCK button 106, a TRUNK UNLOCK button 108, and a REAR WINDOW DOWN button 110. Housing 102 includes a cavity therein that may receive the blade 112 (FIG. 2) of a spare mechanical key 114. Key 114 may be secured within housing 102 by a latch mechanism, which may be released by, for example, depressing a button 116 (FIG. 2) provided on the exterior of housing 102. During normal use of keyfob 100, mechanical key 114 remains stowed within housing 102. However, if keyfob 100 ceases to operate properly (e.g., if the battery contained within keyfob 100 becomes discharged), mechanical key 114 may be removed and used to manually unlock, lock, and start the vehicle.

Figure 3:
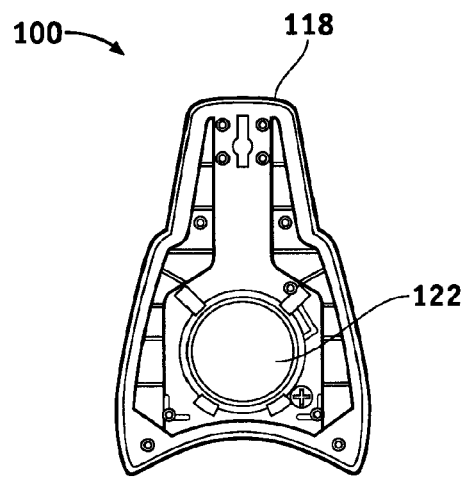
FIGS. 3 and 4 are front and rear cross-sectional views, respectively, of the keyfob shown in FIGS. 1 and 2.
Figure 4:
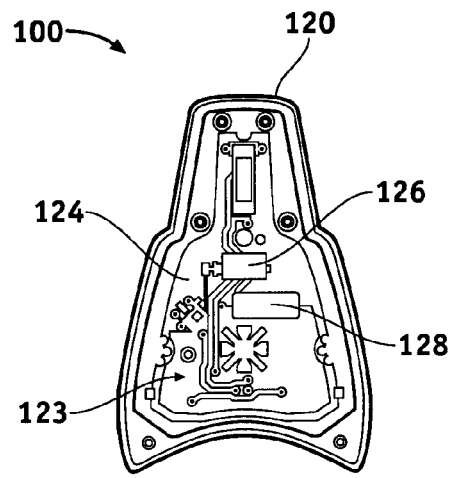

FIGS. 3 and 4 are front and rear cross-sectional views, respectively, of keyfob 100 (mechanical key 114 is not shown for clarity). As can be seen, housing 102 comprises first and second halves or portions 118 (FIG. 3) and 120 (FIG. 4). Portion 118 (FIG. 3) contains a battery 122 (e.g., a button cell) therein, and portion 120 (FIG. 4) contains control circuitry 123 mounted on a printed circuit board 124. A radio frequency transceiver 126 is also mounted on circuit board 124 and coupled to circuitry 123. Transceiver 126 and may send RF signals to and receive RF signals from a second transceiver, which may be deployed onboard a vehicle as described below in conjunction with FIG. 6. Finally, a memory 128 is mounted on circuit board 124 and electrically coupled to control circuitry 123 and, thus, to transceiver 126. In accordance with the present invention, memory 128 is configured to store a plurality of digital files therein. Although memory 128 may store digital files of any desired type (e.g., data files), memory 128 will generally be described herein as storing digital audio files. Additionally, the digital audio files stored in memory 128 may be formatted to any desired digital audio standard including, but not limited to, MP3, WAV, and ACC digital audio standards. The size and storage capabilities of memory 128 may, of course, be varied to suit a particular application; however, as an example, memory 128 may be approximately 512 MB in size and store approximately 120 audio files.

Figure 5:
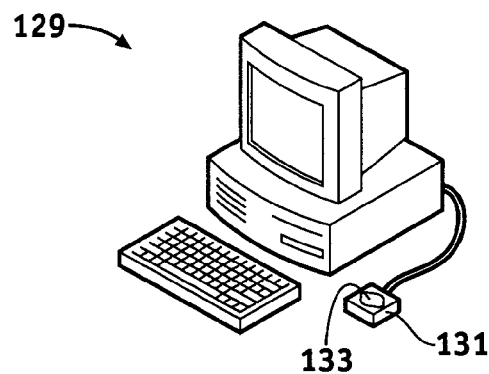
FIG. 5 is an isometric view of a computer connected to a docking station configured to receive the keyfob shown in FIGS. 1-4.

Control circuitry 123 may wirelessly receive digital audio files via transceiver 126 and store the received audio files within memory 128. For example, a personal computer, such as computer 129 shown in FIG. 5, may be utilized to upload digital audio files to memory 128. Computer 129 may transfer data to the inventive keyfob over a physical connection as described below in conjunction with FIGS. 8 and 9. Alternatively, computer 129 may be configured to enable wireless communication with keyfob 100. Though any one of a variety of wireless data transfer means may be utilized (e.g., infrared), computer 129 is preferably equipped with an RF transceiver capable of communicating with transceiver 126. As indicated in FIG. 5, the computer-linked RF frequency transceiver may reside within an external docking station 131 having a cavity 133 therein for receiving stem portion 103 of keyfob 100. Docking station 131 may include a connector cable that is received by a port provided on computer 129 (e.g., a USB port). To facilitate the wireless connection, control circuitry 123 may be configured in accordance with common compatibility standards for wireless local area networks (e.g., Wi-Fi standards) or for personal area networks (e.g., Bluetooth standards). When stem portion 103 is inserted into docking station 131, computer 129 recognizes keyfob 100 as a storage device in the well-known manner. This permits digital audio files (or other digital files) to be transferred between computer 129 and memory 128. If desired, docking station 131 may also be configured to supply power to keyfob 100 (and, if desired, to recharge battery 122) by way of, for example, a conventional induction system such as that described below in conjunction with FIG. 6.

Figure 6:
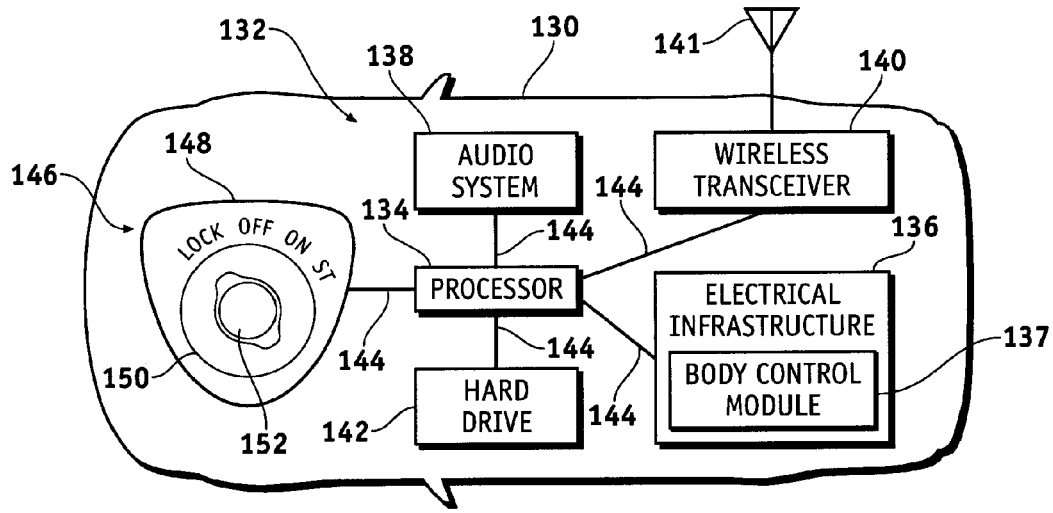
FIG. 6 is a functional view of keyfob integration system deployed on a vehicle and suitable for use in conjunction with the keyfob shown in FIGS. 1-4.

FIG. 6 is a functional view of a vehicular system 130 including a keyfob integration system 132 suitable for use in conjunction with keyfob 100. Keyfob integration system 132 comprises a processor 134, an audio system 138 (e.g., a stereo-system, a radio, a CD player, and/or other such audio components), a wireless transceiver 140, and an electrical infrastructure 136. Electrical infrastructure 136 comprises a body control module (BCM) 137 and may also include various other subsystems deployed on vehicular system 130, such as a battery power management system, an engine and transmission control module, a break control module, etc. If desired, keyfob integration system 132 may also include a hard drive 142 (or other mass storage device with read/write capability) comprising at least one platter or disk (not shown) that may be accessed by a read/write head(s) to transfer data to and from the platter or disk. A plurality of connections 144 (e.g., serial data buses) electrically couple processor 134 to infrastructure 136, audio system 138, transceiver 140, and hard drive 142. Collectively, connections 144 may comprise a controller area network that utilizes standard communication protocols (e.g., J1850 type protocols).

Referring now to FIGS. 1-4 in conjunction with FIG. 6, keyfob transceiver 126 may send RF signals to and receive RF signals from vehicular transceiver 140 via antenna 141. For example, control circuitry 123 may monitor buttons 104, 106, 108, and 110 for user input in the well-known manner. When a user depresses one of buttons 104, 106, 108, and 110, control circuitry 123 emits a corresponding coded RF signal via transceiver 126. If keyfob 100 is sufficiently close to vehicular system 130 (e.g., within a proximity of 16 yards), transceiver 140 will receive and processor 134 will decode the emitted signal. After establishing that the decoded signal is valid (i.e., originates from keyfob 100), processor 134 will next process the signal to determine which keyfob button (i.e., button 104, 106, 108, or 110) the signal identifies as having been depressed by a user. After making this determination, processor 134 then activates the appropriate vehicle function. For example, after determining that decoded signal is indicative of the UNLOCK button 104 having been depressed, processor 134 will command BCM 137 to unlock one or more of the doors on vehicular system 130.

A receptacle 146 (e.g., the vehicle's ignition) may optionally be provided within the passenger compartment of vehicular system 130 and configured to receive keyfob 100. Receptacle 146 may comprise, for example, a base 148 and a socket 150 having a cavity 152 therein. Socket 150 may receive a portion of keyfob 100 (e.g., stem portion 103) within cavity 152. When inserted into cavity 152, keyfob 100 may be turned to rotate socket 150 relative to base 148 between four stable positions: (1) a LOCK position (indicated in FIG. 5 by the text "LOCK") wherein the position lights, hazard warning lights, and interior lights may be activated by a driver; (2) an OFF position (indicated by the text "OFF") wherein certain components of the electrical system may be utilized; (3) an ON position (indicated by the text "ON") wherein the entire electrical system is operative; and (4) a START position (indicated by the text "ST") wherein the vehicle's starter motor is activated. As an anti-theft feature, keyfob integration system 132 may be configured to prevent socket 150 from being rotated until an appropriate identification code is received from keyfob 100.

Receptacle 146 may be configured to supply power to keyfob 100 and, possibly, to recharge battery 122 (FIG. 3).

For example, an electromagnetic induction system may be employed wherein receptacle 146 is equipped with an oscillator circuit and a first coil (not shown). The oscillator circuit may intermittently activate the first coil to generate a time-varying magnetic field proximate cavity 152. A second coil (not shown) is disposed within stem portion 103 and coupled to control circuitry 123. When stem portion 103 is inserted into cavity 152, the second coil is immersed in the magnetic field and a voltage is induced therein. Control circuitry 123 may thus use the induced voltage as an energy source to power control circuitry 123 and/or to recharge battery 122.

Figure 7:
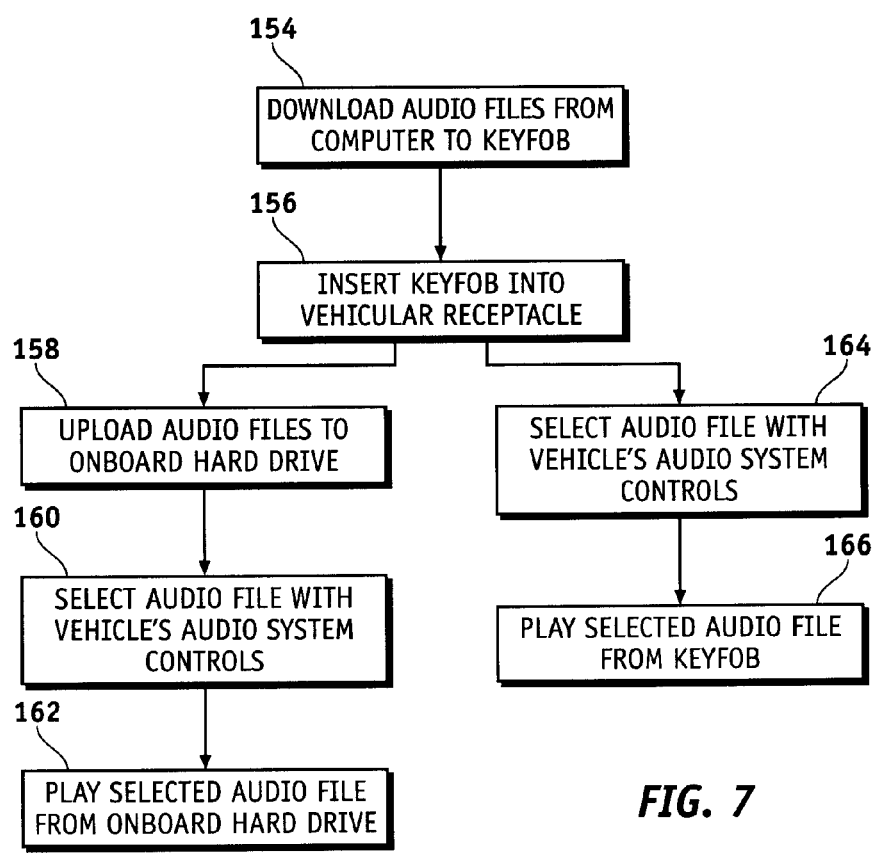
FIG. 7 is a flowchart illustrating one manner in which the keyfob shown in FIGS. 1-4 and the keyfob integration system shown in FIG. 6 may be utilized.

In accordance with an embodiment of the present invention, keyfob integration system 132 may be configured to access digital audio files (or other digital files) stored within memory 128 of keyfob 100. FIG. 7 provides a flowchart illustrating one manner in which keyfob 100 and system 132 may be utilized to play selected digital audio files stored on keyfob 100 through audio system 138. First, one or more audio files are downloaded from a computer (e.g., computer 129 shown in FIG. 5) to memory 128 within keyfob 100 (FIG. 4) as indicated at STEP 154. Next, keyfob 100 is transported into vehicular system 130 by a user, and stem portion 103 is inserted into socket 150 of receptacle 146 (STEP 156). In a first configuration, processor 134 may monitor receptacle 146 for the insertion of keyfob 100 or a similar event (e.g., turning socket 150 to the START position). After keyfob 100 has been inserted into receptacle 146, processor 134 initiates wireless communication with control circuitry 123 in the manner described above. In particular, processor 134 may query control circuitry 123 to determine if digital audio files are currently stored within memory 128. If determining that memory 128 contains digital audio files, processor 134 may then command control circuitry 123 to upload the files stored within memory 128 to hard drive 142 (STEP 158). A user (e.g., a driver) may subsequently navigate through the uploaded files via a user interface (e.g., a display and controls associated with audio system 138, a driver information center, etc.) and select a desired audio file (STEP 160). Audio system 138 will then play the audio file from hard drive 142 (STEP 162).

In an alternative configuration, keyfob integration system 132 may read/play a selected audio file while the audio file is simultaneously being received from keyfob 100. In such a streaming audio configuration, the user may first select an audio file from those stored in memory 128 as described above (STEP 164). Processor 134 may then send a signal to control circuitry 123 indicative of the selected audio file. Control circuitry 123 accesses memory 128, retrieves the selected audio file, and initiates transmission of the selected file via transceiver 126. As it is received by transceiver 140, processor 134 relates the transmitted file to audio system 138. Audio system 138 plays the selected file as it is related by processor 134 (STEP 166).

It should thus be appreciated from the forgoing that keyfob integration system 132 may be configured to upload digital audio files (or other data files) from keyfob 100, to play audio files directly from keyfob 100, or to perform a combination of these two approaches. Each of these configurations provides certain advantages. For example, by uploading data files to a mass storage device with read/write capability (e.g., hard drive 142), system 132 may achieve relatively high sampling rates and, therefore, maximize audio quality. In addition, copies of the audio files stored on keyfob 100 may be created in hard drive 142 thereby allowing the audio files to be accessed in the absence of keyfob 100. In contrast, a streaming audio configuration does not require that keyfob integration system 132 be provided with a mass storage device and thus may be less costly to implement. However, to achieve satisfactory audio quality in a streaming audio configuration, the wireless data transfer rate should ideally meet or exceed 16 kilobits per second, and a data transfer rate of 128 kilobits per second is preferred. Any suitable network protocol may be utilized to support such a streaming audio configuration, including User Datagram Protocol, Real-time Transport Protocol, Real Time Streaming Protocol, Real Time Transport Protocol, Real Time Control Protocol, Bluetooth, etc.

Figure 8:
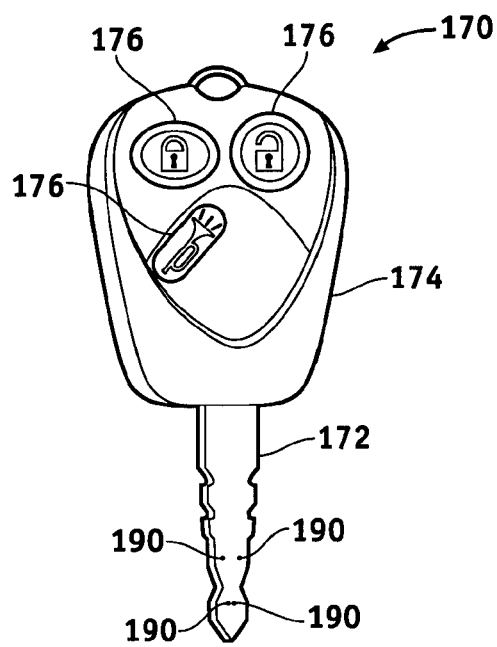
FIGS. 8 and 9 are isometric and cross-sectional views, respectively, of a keyfob having a mechanical key fixedly coupled thereto in accordance with a second embodiment of the present invention.
Figure 9:
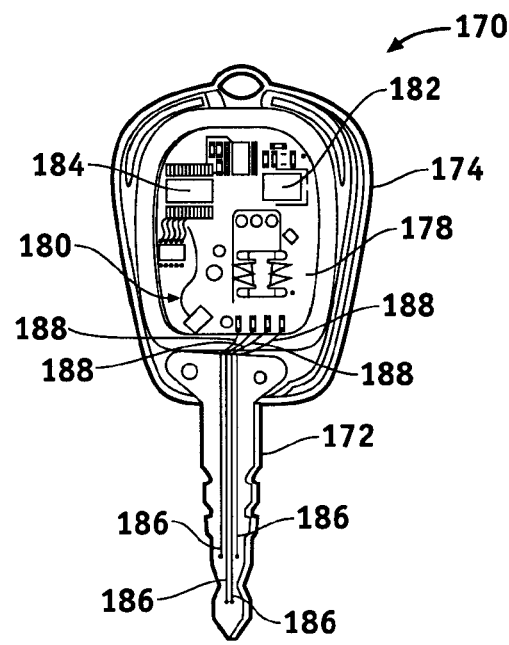

Although the inventive keyfob and integration system have been described above as utilizing an RF-based communication system, it should be appreciated that other wireless communication systems may be utilized including, but not limited to, induction-based systems, low frequency (e.g., 30-300 kHz) communication systems, and infrared communication systems. Furthermore, it should be understood that the inventive keyfob may also be configured to communicate with a keyfob integration system over a physical connection. To further illustrate this point, FIGS. 8 and 9 provide isometric and cross-sectional views, respectively, of a keyfob 170 having a connector 172 fixedly coupled thereto. As will be appreciated by one skilled in the art, connector 172 may comprise any one of variety of connectors, including various conventional multi-pin connectors (e.g., a D-subminiature connector, a USB connector similar to that employed by a portable flash drive device, etc.). For example, connector 172 may assume the form of a mechanical key as illustrated in FIGS. 8 and 9 and described in more detail below. In a similar manner to keyfob 100 (FIGS. 1-4), keyfob 170 may comprise a housing 174 having a plurality of buttons 176 disposed thereon. A circuit board 178 is disposed within housing 174 and supports control circuitry 180, a memory 182, and an RF transceiver 184. Memory 182 may store a plurality of digital files (e.g., digital audio files, data files, etc.), and transceiver 184 may send and receive RF signals as described above.

Mechanical key 172 comprises an insulative body (e.g., plastic) that carries a plurality (e.g., four) of leads 186 therein (FIG. 9). At the proximal end of key 172, leads 186 may be coupled to control circuitry 180 via a plurality of connectors (e.g., metal wires) 188. Each lead 186 is provided with a distal electrical contact 190, which is exposed through key 172 as shown in FIG. 8. Mechanical key 172 is received by a receptacle (e.g., receptacle 146 in FIG. 6) having a plurality of electrical contacts therein (not shown). The electrical contacts within the receptacle electrically couple electrical contacts 190 to the processor (e.g., processor 134) of a keyfob integration system (e.g., system 132). Leads 186 thus permit electrical communication between the integration system and control circuitry 180. By providing an electrical connection in this manner, keyfob 170 allows a relatively high data transfer rate between keyfob memory 182 and the processor of the integration system. Keyfob 170 is thus well suited for use in conjunction with a streaming audio integration system of the type described above.

In addition to permitting the uploading of digital files from a keyfob to an onboard hard drive (or other mass data storage device), the inventive keyfob integration system also contemplates the downloading of data files from an onboard hard drive to the keyfob. For example, referring once again to FIG. 6 in conjunction with FIGS. 1-4, a user may first select one or more data files to be downloaded from hard drive 142 utilizing a user interface provided on vehicular system 130 (e.g., an interface associated with audio system 138). Next, processor 134 accesses the selected digital audio files from hard drive 142, and vehicular transceiver 140 wirelessly transmits the selected audio files to keyfob transceiver 126. Control circuitry 123 then stores the selected audio files in memory 128 as they are received. A vehicle-to-fob transfer system of this type may be particularly useful if, for example, audio files are downloaded to hard drive 142 from an external source other than keyfob 100 (e.g., a satellite system, such as an XM or other radio satellite; or a telematics system, such as OnStar). After transferring the digital files to keyfob 100, the data files may be uploaded to a computer, such as computer 129 described above in conjunction with FIG. 5.

The inventive keyfob and keyfob integration system may be configured to help preserve Digital Rights Management (DRM) protected content by automatically transferring any additional files (e.g., lists of multimedia content) corresponding to uploaded/downloaded digital audio files with the uploaded/downloaded file. In addition, DRM protection may be achieved by utilizing an encryption system, such as a conventional public key encoding system wherein a vehicle identification number (VIN) serves as the public key.

It should thus be appreciated that a keyfob for storing digital files, including digital audio files, has been provided. It should further be appreciated that a keyfob integration system has also been provided that enables a user to easily access files stored on the keyfob. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any manner. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is

1. A keyfob for use in a vehicle having a processor and an ignition, the keyfob comprising:
    a housing;
    a battery disposed within said housing;
    control circuitry disposed within said housing and coupled to said battery;
    a memory disposed within said housing and coupled to said control circuitry, said memory configured to store digital audio files therein accessible by the processor;
    a mechanical key fixedly coupled to said housing and keyed for use with the ignition; and
    a plurality of data transmitting leads extending within said mechanical key and electrically coupled to said control circuitry, said plurality of data transmitting leads permitting said control circuitry to transmit data to the processor when said mechanical key is inserted into the ignition;
    wherein said control circuitry is configured to transmit at least one of the stored digital audio files to the processor via said plurality of data transmitting leads when said mechanical key is inserted into the ignition.

2. A keyfob system for use in conjunction with a vehicle, comprising:
    a processor deployed on the vehicle;
    a first transceiver deployed on the vehicle and coupled to said processor;
    an audio system coupled to said processor;
    a keyfob, comprising:
        a housing;
        a battery disposed within said housing;
        a memory disposed within said housing and configured to store a plurality of digital audio files therein;
        control circuitry disposed within said housing and coupled to said memory and to said battery for communicating with said processor to enable said audio system to play selected ones of said plurality of digital audio files and
        a second transceiver disposed within said housing and coupled to said control circuitry;
    a receptacle located on the vehicle and coupled to said processor, said receptacle configured to receive said keyfob therein; and
    an electromagnetic induction system deployed within said receptacle and configured to charge said battery when said keyfob is received by said receptacle;
    wherein said control circuitry causes said second transceiver to wirelessly transmit data pertaining to said plurality of digital audio files to said first transceiver, and thus to said processor, when said keyfob is inserted into said receptacle.

3. A keyfob system according to claim 2 wherein said audio system is configured to play a selected one of said plurality of digital audio files as said selected one is received by said processor.

4. A keyfob system according to claim 2 further comprising a hard drive coupled to said processor, said hard drive for storing at least one of said selected ones of said plurality of digital audio files.

5. A keyfob system according to claim 2 wherein said processor is configured to automatically upload at least one of said plurality of digital audio files to said hard drive upon insertion of said keyfob into said receptacle.

6. A keyfob system according to claim 2 further comprising a computer docking station configured to be coupled to a computer to enable the computer to upload digital audio files to said memory.

7. A keyfob integration system deployed on a vehicle for use in conjunction with a keyfob including control circuitry, a battery, and a memory for storing a plurality of digital audio files, said keyfob integration system comprising:
    an audio system;
    a hard drive;
    a receptacle for receiving the keyfob;
    an electromagnetic induction system configured to charge said battery; and
    a processor coupled to said audio system, to said hard drive, and to said receptacle, said processor configured to: (i) monitor said receptacle for insertion of the keyfob, (ii) query the control circuitry to determine if digital audio files are stored in the memory when the keyfob has been inserted into said receptacle, and (iii) if digital audio files are stored in the memory, automatically upload at least one of the digital audio files to said hard drive for accessing a selected one of said plurality of digital audio files when the keyfob is received by said receptacle to enable said audio system to play said selected one.

8. A keyfob integration system according to claim 7 further comprising a radio frequency transceiver coupled to said processor, said transceiver for enabling wireless communication between said processor and the keyfob.

* * * * *